May 28, 1935.   G. R. SIEGRIST   2,003,014
COMBINED LUBRICATING AND SHOCK ABSORBING MECHANISM FOR MOTOR VEHICLES
Filed Nov. 27, 1929

INVENTOR.
George R. Siegrist
BY
Parker & Burton
ATTORNEYS

Patented May 28, 1935

2,003,014

UNITED STATES PATENT OFFICE 2,003,014

COMBINED LUBRICATING AND SHOCK ABSORBING MECHANISM FOR MOTOR VEHICLES

George R. Siegrist, Port Huron, Mich.

Application November 27, 1929, Serial No. 410,029

7 Claims. (Cl. 184—7)

My invention relates to improvements in vehicle chassis lubricating mechanism or, more particularly, to vehicle chassis lubricating and shock absorbing mechanism.

It is here shown embodied in a construction applied to an automotive vehicle chassis equipped with fluid pressure shock absorbing means adapted to cushion the shock of road travel of the vehicle and comprising lubricant dispensing apparatus adapted to deliver lubricant under pressure to a part or parts to be lubricated, which dispensing apparatus is combined and coordinated with suitable fluid pressure shock absorbing means carried by the chassis to be operably responsive to the functioning of said shock absorbing means, and preferably within a determined range of function and after a predetermined manner as designed.

An object of my invention is to provide, in conjunction with suitable fluid pressure shock absorbing mechanism, fluid pressure lubricating means coupled therewith, and preferably arranged as a part thereof which is operably responsive to fluid pressure created in the compression chamber of the shock absorber device due to its functioning in resisting movement of the chassis produced by road travel of the vehicle, whereby lubricant is delivered by such operation of the lubricant fluid pressure mechanism to the parts to be lubricated.

In combining the shock absorber and lubricator mechanism in one device, fluid lubricant is used as the fluid shock absorbing medium. This fluid shock absorbing lubricating medium is fed under pressure to parts to be lubricated which parts are grouped about the lubricating devices, one being provided at each corner of the vehicle. Means are provided to prevent exhaustion of the fluid medium by lubrication to such an extent as to prevent functioning of the shock absorbing device. Long lengths of tubing are eliminated due to the provision of a combined lubricator and shock absorber device at each corner of the vehicle.

An object of my invention is that a new method is evolved of lubricating a vehicle chassis in that a fluid pressure shock absorber of a generally conventional type is employed as the source of power to feed lubricant under pressure to the parts to be lubricated.

Various other objects, advantages and meritorious features of my invention will appear more fully from the following description, appended claims and accompanying drawing, wherein,—

Figure 1:
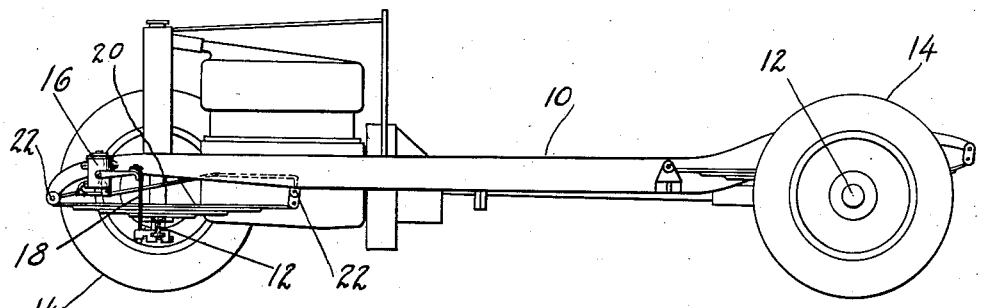
Figure 2:
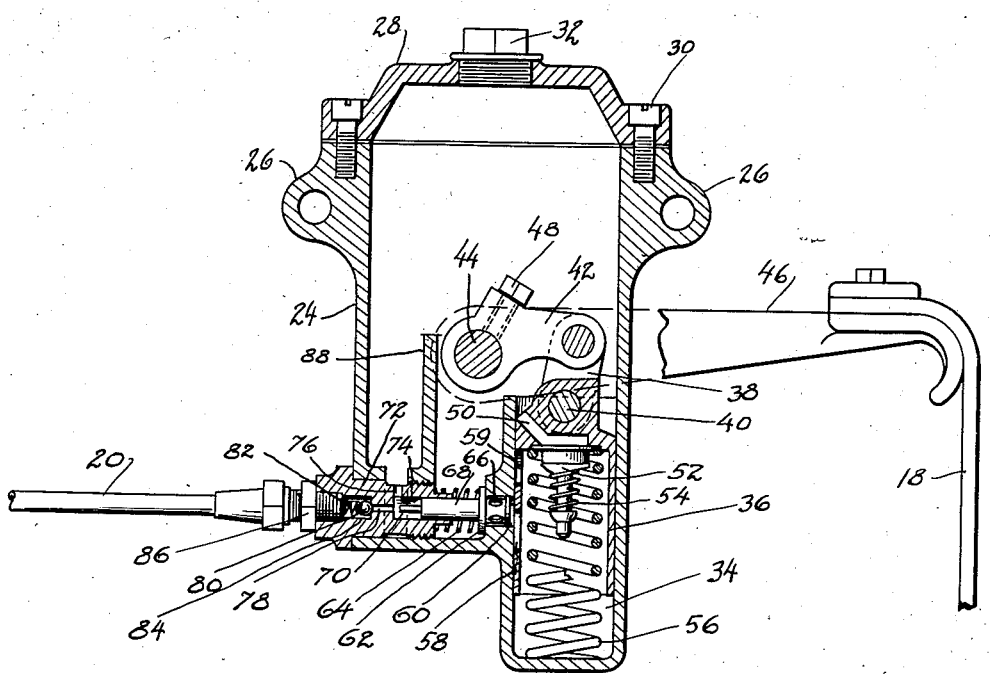

Fig. 1 is a side diagrammatic elevation of an automotive vehicle chassis equipped with my invention, Fig. 2 is a vertical sectional view through a construction embodying my invention.

I have illustrated my invention as embodied in a construction attached to a motor vehicle chassis wherein, in Fig. 1, a chassis of this character is indicated as provided with a frame 10 spring-supported upon axles 12 which carry road wheels 14 and my improved shock absorber and lubricating device is shown in assembly at 16. The casing is mounted, one at each corner, upon one of the side frame members of the chassis and an operating connection such as a strap 18 extends from the operable part of the mechanism to a bracket carried by the axle whereby the shock absorber device functions to cushion the shock of road travel of the vehicle. A conduit 20 leads from the lubricant impelling portion of the general assembly to various parts to be lubricated such as a part 22 indicated on the chassis.

In my invention I employ suitable shock absorbing mechanism of a generally known type and in Fig. 2 an embodiment of my invention of this character is illustrated. In this figure there is a casing 24 provided with ears 26 through which fastening bolts may be extended to secure the casing to the frame in the manner shown in Fig. 1. This casing is provided with a cover plate 28 secured thereto by screws 30 and the cover plate is fitted with a filler cap 32 through which liquid may be poured into the casing.

The casing itself is so formed as to provide a compression cylinder or chamber 34 wherein a piston 36 is disposed. A link 38 is pivoted at one end to a piston pin 40 and at the opposite end to an arm 42 which is mounted upon a shaft 44, the opposite end of which shaft carries an arm 46 to which strap 18 is secured. A set screw 48 adjustably secures the arm 42 to the shaft 44.

The piston 36 is of hollow form and the head thereof is provided with a passageway 50 extending therethrough and closed by a valve 52, held to its seat by a spring 54. A large spring 56 seats in the bottom of the compression chamber 34 and serves to hold the piston itself upwardly.

One wall of the piston is provided with a plurality of openings 58 and 59 adapted to register with an opening 60 through the compression chamber wall. The two openings 58 and 59 are of such size and so spaced apart that at least a portion of one of them is at all times in registry with opening 60. The lower opening 58 is the larger of the two, as clearly indicated in the drawing, and as it moves out of registry with opening 60 on the downward stroke of the piston 36, the smaller of the two openings 59 begins to come into registry with opening 60. Within opening 60 is seated a valve 62 held to its seat by a spring 64 and itself provided with a plurality of openings 66 whereby escape of lubricant from the compression chamber is permitted.

The valve 62 has a valve stem 68 provided with a reduced end portion 70. The casing 24 is cored out to receive a cylindrical bushing 72 threaded therein as shown in Fig. 2 and itself cored out as at 74 to receive the enlarged portion 68 of the valve stem. This cored out passageway 74 communicates through an inlet 76 with the interior of the casing to receive lubricant therefrom.

The bushing 72 has a cored out portion 78 of reduced diameter which communicates with the cored out passageway 74 and is positioned to receive the reduced end 70 of the valve stem. The outer end of this passageway 78 is normally closed by a check valve 80 held to its seat by a spring 82 in an enlarged passageway 84. The outer end of this passageway is closed by a nipple 86 threaded therein and terminating in the conduit 20 heretofore referred to which leads to various parts to be lubricated.

This bushing construction 72, cored out as described, forms a pump chamber. The passageway 76, which leads to the interior of the casing 24, leads directly into a compartment in said casing formed by a transverse wall 88 which rises to such a height within the casing as to insure that there shall remain in that portion of the casing outside of the wall sufficient liquid to permit the functioning of that shock absorbing portion of the mechanism.

The reservoir casing is filled with an oil suitable for lubrication and adapted to serve as a shock absorbing fluid medium by removal of the filler cap 32, and this cap should be provided with a vent and might also be provided with a screen.

In the travel of the car over the road, the strap 18 actuates the arm 46 which through the shaft 44 actuates the arm 42 and moves the piston 36 within the cylinder 34. On the rebound from a road shock the strap tightens, pulling the piston 36 downwardly into the cylinder and the trapped lubricant is permitted to escape through the restricted openings 58 when they are brought to register with the opening 60 through the cylinder wall and the pressure of the fluid unseats the valve 62. On minor shocks the valve is moved only slightly but on major shocks it is forced completely from its seat and the reduced end portion 70 enters the passageway 78 which is filled with lubricant at all times and unseats the ball valve 80, forcing the lubricant outwardly.

It will be seen that this mechanism functions as a pump to eject lubricant under pressure to pass the ball valve 80 and through the conduit 20 to a part to receive lubricant, but that this response to the pumping mechanism is only within a predetermined range of damping vibration and that outside or rather below this range the shock absorber functions as a shock absorber without causing the pumping mechanism to respond thereto.

It likewise will appear that due to the provision of the partition 88 a separate compartment is provided within the reservoir or casing 24 to which lubricant may flow from the casing until the lubricant level comes below the height of the partition and that as a result of this if the lubricant level does come below this height, sufficient lubricant will therefore remain to cause the shock absorbing mechanism to function without completely draining the casing through the functioning of the pumping mechanism.

I claim:

1. Vehicle lubricating mechanism comprising, in combination with a liquid pressure shock absorber carried by a vehicle to cushion the shock of road travel thereof, said shock absorber including a casing containing liquid suitable for lubrication, a part to be lubricated communicating with said casing, and means within said casing responsive to fluid pressure created therein by the shock of road travel of the vehicle operable to deliver lubricant under pressure therefrom to the part to be lubricated.

2. In liquid pressure lubricating and shock absorber mechanism for a vehicle, a liquid reservoir, a liquid compression chamber arranged therein to receive liquid therefrom, means responsive to vehicle travel operable to place the liquid in the compression chamber under pressure, liquid operated pumping mechanism arranged within the liquid reservoir communicating therewith to receive liquid therefrom and responsive to liquid pressure developed in the compression chamber to operatively respond to deliver lubricant under pressure.

3. In liquid pressure lubricating and shock absorber mechanism for a vehicle, a liquid reservoir, a liquid compression chamber arranged therein to receive liquid therefrom, means responsive to vehicle travel operable to place the liquid in the compression chamber under pressure, a second chamber within the reservoir arranged to receive liquid therefrom, liquid operated pumping mechanism communicating with said second chamber to receive liquid therefrom, said pumping mechanism responsive to liquid pressure impulses created in said compression chamber to be operated to deliver lubricant under pressure.

4. In liquid pressure lubricating and shock absorber mechanism for a vehicle, a liquid reservoir, a liquid compression chamber arranged therein to receive liquid therefrom, means responsive to vehicle travel operable to place the liquid in the compression chamber under pressure, a second chamber within the reservoir arranged to receive liquid therefrom so long as the liquid within the reservoir is maintained at a predetermined level, liquid operated pumping mechanism communicating with said second chamber to receive liquid therefrom and operably responsive to liquid pressure created in the compression chamber to be operatively actuated thereby to pump liquid under pressure.

5. In liquid pressure lubricating and shock absorber mechanism for a vehicle, a liquid reservoir, a liquid compression chamber arranged therein to receive liquid therefrom, means responsive to vehicle travel operable to place the liquid in the compression chamber under pressure, valve mechanism operable to permit the escape of liquid from said compression chamber under pressure, liquid operated pumping mechanism responsive to the movement of said valve mechanism to be operatively actuated to pump liquid under pressure to a part to receive liquid.

6. In liquid pressure lubricating and shock absorber mechanism for a vehicle, a liquid reservoir, a liquid compression chamber arranged therein to receive liquid therefrom, means responsive to vehicle travel operable to place the liquid in the compression chamber under pressure, valve mechanism operable to permit the escape of liquid from said compression chamber under pressure, liquid operated pumping mechanism including in part said valve mechanism operable upon the opening of said valve to permit the escape of a predetermined amount of liquid to operatively respond to eject liquid under pressure to a part to receive the same.

7. In fluid pressure lubricating, and shock absorbing mechanism for a vehicle, a reservoir containing liquid lubricant and having a compression chamber communicating therewith, means arranged within the compression chamber responsive to vehicle travel operable to place the liquid therein under pressure, valve mechanism operable to permit the escape of liquid from said chamber, a part to be lubricated, lubricant pumping mechanism communicating with said part and including in part said valve mechanism and responsive to a predetermined opening of the valve to be operatively actuated to deliver the lubricant from the reservoir to a part to be lubricated.

GEORGE R. SIEGRIST.